United States Patent [19]

Uno et al.

[11] 4,065,439

[45] Dec. 27, 1977

[54] COPOLYESTER AND PROCESS FOR THE PRODUCTION THEREOF

[75] Inventors: Keiichi Uno; Takahito Miyagawa, both of Otsu, Japan

[73] Assignee: Toyobo Co., Ltd., Otsu, Japan

[21] Appl. No.: 585,753

[22] Filed: June 10, 1975

[51] Int. Cl.$^2$ .............................................. C08G 63/18
[52] U.S. Cl. .................. 260/75 R; 156/332; 260/31.8 XA; 428/480
[58] Field of Search ........................................ 260/75 R

[56] References Cited

U.S. PATENT DOCUMENTS

| | | | |
|---|---|---|---|
| 3,668,277 | 6/1972 | Riemhofer et al. | 260/75 R X |
| 3,682,863 | 8/1972 | McHale | 260/75 R |
| 3,699,187 | 10/1972 | Gardziella | 260/860 |

FOREIGN PATENT DOCUMENTS

| | | |
|---|---|---|
| 1,522,636 | 9/1969 | Germany. |
| 2,126,048 | 11/1972 | Germany. |
| 1,118,538 | 7/1968 | United Kingdom. |

Primary Examiner—Howard E. Schain
Assistant Examiner—W. C. Danison, Jr.
Attorney, Agent, or Firm—Birch, Stewart, Kolasch and Birch

[57] ABSTRACT

A copolyester useful for adhesives, paints, surface treating agents, plasticizers, binders, or the like, which comprises the following five components:

a. terephthalic acid, b. isophthalic acid, c. an aliphatic dicarboxylic acid of the formula:

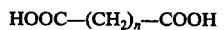

$$HOOC-(CH_2)_n-COOH$$

wherein $n$ is an integer of 4 to 7, inclusive, d. ethylene glycol, and e. neopentyl glycol, the said copolyester containing the five components in the following molar ratio:

$$50/50 \leq [(a)+(b)]/(c) \leq 75/25$$

$$30/70 \leq (a)/(b) \leq 70/30$$

$$40/60 \leq (d)/(e) \leq 80/20$$

and a process for the production thereof.

6 Claims, No Drawings

COPOLYESTER AND PROCESS FOR THE PRODUCTION THEREOF

The present invention relates to a copolyester and a process for the production thereof. More particularly, it relates to a copolyester useful for adhesives, paints, surface treating agents, plasticizers, binders, or the like, and a process for the production thereof.

Aromatic polyesters such as polyethylene terephthalate have excellent mechanical properties, thermal properties, chemical properties and electrical properties, and therefore, they are widely used for producing fibers, films, molding products, or the like. However, these conventional aromatic polyesters show inferior softness and further are insoluble in many conventional organic solvents and are soluble in a very few solvents such as a mixed solvent of phenol and tetrachloroethane, trifluoroacetic acid or the like only by heating. Accordingly, it is very difficult to use these conventional aromatic polyesters for adhesives, paints, plasticizers, surface treating agents, binders, or the like. For improving the properties of the aromatic polyesters and for making them suitable for the above utilities, aliphatic dicarboxylic acids and/or other glycol components have been copolymerized to the aromatic polyester.

However, when the aliphatic dicarboxylic acids and/or other glycol components are copolymerized for the purpose of giving the desired softness and the solubility in organic solvents to the aromatic polyesters, it results in that the mechanical and thermal properties of the polyester are deteriorated. Thus, there has never been known any polyester having excellent softness and solubility in the conventional organic solvents as well as excellent mechanical and thermal properties which are sufficient for practical use.

Under the circumstances, the present inventors have extensively studied to find a copolyester having excellent softness and stable solubility in the conventional organic solvents as well as excellent mechanical and thermal properties which are sufficient for practical use and further a low melt viscosity and solution viscosity which is useful for adhesives, paints, plasticizers, surface treating agents, binders, or the like, and have found that the desired copolyester can be produced by copolymerizing a specific combination of carboxylic acids (i.e. terephthalic acid or its derivative, isophthalic acid or its derivative and a specific aliphatic dicarboxylic acid) and a specific combination of glycols (e.g. ethylene glycol and neopentyl glycol).

An object of the present invention is to provide a copolyester useful for adhesives, paints, surface treating agents, plasticizers, binders, or the like.

Another object of the invention is to provide a process for producing a copolyester having excellent softness and solubility in the conventional organic solvents as well as excellent mechanical and thermal properties.

These and other objects of the invention will be apparent from the description hereinafter.

According to the present invention, the desired copolyester can be produced by copolymerizing the following five components in a conventional manner
 a. terephthalic acid or its ester-forming derivative,
 b. isophthalic acid or its ester-forming derivative,
 c. an aliphatic dicarboxylic acid of the formula:

$$HOOC-(CH_2)_n-COOH$$

wherein $n$ is an integer of 4 to 7, inclusive, or its ester-forming derivative,
 d. ethylene glycol, and
 e. neopentyl glycol,
so that the said five components are contained in the copolyester in the following molar ratio:

$$50/50 \leqq [(a) + (b)]/(c) \leqq 75/25$$

$$30/70 \leqq (a)/(b) \leqq 70/30$$

$$40/60 \leqq (d)/(e) \leqq 80/20.$$

The ester-forming derivatives of terephthalic acid used in the present invention include dimethyl terephthalate, diethyl terephthalate, dipropyl terephthalate, dibutyl terephthalate, diphenyl terephthalate, terephthalic dichloride, and the like.

The ester-forming derivatives of isophthalic acid used in the present invention include dimethyl isophthalate, diethyl isophthalate, dipropyl isophthalate, dibutyl isophthalate, diphenyl isophthalate, isophthalic dichloride, and the like.

The aliphatic dicarboxylic acids of the formula: $HOOC-(CH_2)_n-COOH$ wherein $n$ is an integer of 4 to 7, inclusive may be adipic acid, pimelic acid, suberic acid, azelaic acid, or the like. Among them, adipic acid is the most suitable one. The ester-forming derivatives of the aliphatic dicarboxylic acids include the esters of the aliphthaic dicarboxylic acids (e.g. dimethyl ester, diethyl ester, dipropyl ester, dibutyl ester, diphenyl ester or dichloride).

There has been known a copolyester produced by using sebacic acid as the aliphatic dicarboxylic acid (British Patent Specification No. 1,118,538 and German Offenlegungsschrift No. 1,522,636). However, when sebacic acid or dodecanedionic acid is used instead of the aliphatic acid in the present invention, the obtained copolyester shows inferior antiblocking when it is coated onto films or foils. On the other hand, when succinic acid or glutaric acid is used instead of the aliphatic dicarboxylic acid in the present invention, a remarkable pyrolysis occurs during the melt-polycondensation reaction at a high temperature and therefore the desired copolyester suitable for adhesives, paints or the like can not be produced.

The copolyester of the present invention comprises the five components (a), (b), (c), (d) and (e) in the following molar ratio:

$$50/50 \leqq [(a) + (b)]/(c) \leqq 75/25$$

$$30/70 \leqq (a)/(b) \leqq 70/30$$

$$40/60 \leqq (d)/(e) \leqq 80/20,$$

preferably, $$55/45 \leqq [(a) + (b)]/(c) \leqq 65/35$$

$$30/70 \leqq (a)/(b) \leqq 70/30$$

$$40/60 \leqq (d)/(e) \leqq 80/20.$$

That is, the molar ratio of $(a)/(b)/(c)$ is 15–52.5/15–52.5/25–50, preferably 16–45/16–45/35–45 and the molar ratio of $(d)/(e)$ is 40–80/20–60. When the molar ratio of the total of the components $(a)$ and $(b)$: the component $(c)$ in the copolyester, i.e. $[(a) + (b)]/(c)$ is over 75/25, the obtained copolyester is rigid and shows a low flexibility and inferior mechanical properties. On the other hand, when the molar ratio is less than 50/50, the obtained copolyester shows a lower cohesive force and lower adhesion and heat resistance.

When the molar ratio of the component (a): the component (b) in the copolyester, i.e. (a)/(b) is over 70/30, the obtained copolyester shows a lower solubility in organic solvents and a lower solution stability, and on the other hand, when the molar ratio is less than 30/70, the obtained copolyester shows inferior thermal and mechanical properties.

Besides, when the molar ratio of the component (d): the component (e) in the copolyester, i.e. (d)/(e) is over 80/20, the obtained copolyester shows a lower solubility in the conventional organic solvents and an extremely low solution stability, and on the other hand, when the molar ratio is less than 40/60, the obtained copolyester has a lower melting point and inferior mechanical properties.

Among the copolyesters produced by the present invention, the most suitable one is a copolyester comprising terephthalic acid residue/isophthalic acid residue/adipic acid residue wherein the molar ratio is 25–35/25–35/35–45 and ethylene glycol residue/neopentylglycol residue wherein the molar ratio is 50–60/40–50.

The desired copolyester having excellent properties of the present invention can be produced only by copolymerizing the five components in the specific molar ratio, and when any one of the components is lacking or the molar ratio of the five components is out of the specific range, the desired copolyester can not be obtained.

The copolymerization process per se used in the present invention is the conventional one. That is, the copolymerization reaction of the present invention can be carried out in the conventional manner, for instance, by producing glycol esters of the acids by a direct esterification of the acids and the glycols or a transesterification of the carboxylic acids alkyl esters and the glycols and then copolymerizing the resultant by a conventional copolymerization method which is usually used for the production of polyesters, such as a melt-polymerization method or a solid phase polymerization method. Alternatively, the copolyester may be produced by depolymerizing by heating polyesters (e.g. polyethylene terephthalate) with glycols or acids and then copolymerizing the resultant with acids or glycols.

In the present invention, other components than the above five components may additionally be used. The other components include a tri- or higher functional glycol or acid, such as glycerine, pentaerythritol, trimellitic acid, pyromellitic acid or the like, which is used in an amount that the desired properties of the copolyester are not deteriorated. Besides, for promoting the reaction, there may also be used various conventional catalysts used for esterification, transesterification or polycondensation reactions. Moreover, various modifiers, stabilizers and/or pigments may also be used depending on the desired properties of the product.

The copolyester produced by the present invention has excellent thermal and mechanical properties, adhesion, solubility into solvents, solution stability, and is particularly excellent in the solubility into solvents and the solution stability, and therefore, it can be used for the following various purposes.

When the copolyester of the present invention is used for solvent type adhesives, it is dissolved in an organic solvent. Suitable examples of the solvent are benzene, toluene, acetone, chloroform, ethyl acetate, n-butyl acetate, dioxane, tetrahydrofuran, cyclohexanone, methyl ethyl ketone, phenol or the like, which may be used alone or in a mixture thereof.

When it is used for hot-melt type adhesives, the copolyester of the present invention is very advantageous because it has a lower melt viscosity in comparison with the conventional polyesters used for hot-melt type adhesives. For using the copolyester of the present invention as the hot-melt type adhesives, it may be applied by various methods, and the most suitable method may be chosen depending on the adhesion method and the substrate to be adhered. For instance, the copolyester may be formed in various shapes, such as powders, chips, tapes, cords, films or the like and the formed product is put between the substrates to be adhered and then the resultant is heated above the softening point of the copolyester to adhere the substrates. Alternatively, the copolyester is molten and the molten copolyester is previously applied to the substrates to be adhered and cooled, and thereafter, the resultant is heated at an optional time to adhere the substrates. Besides, for improving the heat resistance and the solvent resistance of the adhered product, an agent capable of forming a three-dimensional structure in the copolyester, such as isocyanate compounds, epoxy compounds, aziridyl compounds or the like may be added during the adhesion procedure, by which the copolyester is crosslinked.

When the copolyester of the present invention is used for adhesives, there is no limitation in the kinds of the materials or the shapes of the substrates to be adhered. The present copolyester is particularly useful for the adhesion of various plastic films and metal foils.

Moreover, the copolyester of the present invention may be used as surface treating agents for glass fibers or films, wherein the copolyester is used in the form of a solution in a solvent. Besides, the present copolyester may be used as low shrinking agents for unsaturated polyesters, surface smoothing agents, plasticizers for thermoplastic compounds, (e.g. polyvinyl chloride or polyester acrylate), or binders in case of the coating of metal oxides onto the substrates.

The present invention is illustrated by the following Examples but is not limited thereto.

In the Examples, the intrinsic viscosity $[\eta]$ is measured in phenol/sym-tetrachloroethane (60/40 by weight) at 30° C, and the melting point is measured by using a micro-melting point apparatus (made by Yanagimoto Seisakusho), wherein the temperature is raised at a rate of 1° C/minute.

The abbreviations used in the Examples have the following meanings:
TPA: terephthalic acid
IPA: isophthalic acid
EG: ethylene glycol
NPG: neopentyl glycol
DEG: diethylene glycol

EXAMPLE 1

A one liter autoclave is charged with dimethyl terephthalate (0.562 mol), dimethyl isophthalate (0.562 mol), ethylene glycol (2.88 mol), neopentyl glycol (1.24 mol), zinc acetate dihydrate (118 mg, as a transesterification catalyst) and antimony trioxide (246 mg, as a polycondensation catalyst). The mixture is heated at 160°–210° C to effect transesterification. When it is heated for about 2 hours, the theoretical amount of methanol is distilled and thereby the transesterification reaction is completed. To the reaction mixture is added a small amount of trimethyl phosphate. The mixture is heated with stirring at 200°–210° C for 30 minutes. After raising the temperature to 220° C, to the mixture is added adipic acid (109.4 g; 0.748 mol) and the mixture is heated at 220°–230° C for 30 minutes to effect esterification. Thereafter, the temperature is raised to 250° C and simultaneously the pressure in the autoclave is gradually reduced and then the excess glycol is distilled off at 250° C. and at 10 mmHg. Continuing the raising of the temperature and the reduction of the pressure, the final temperature and pressure become 270° C and 0.3 mmHg, respectively, and then the mixture is subjected to the polymerization reaction for 2 hours to give a colorless polymer (1) having an intrinsic viscosity $[\eta]$ of 0.65.

In the same manner as described above, various polymers (2 to 7) are produced. All of the products have an intrinsic viscosity $[\eta]$ of more than 0.60.

With these polymers, the solubility into various solvents is tested. The results are shown in Table 1.

Table 1

| Product No. | Polymer component (molar ratio) Acid residue | Glycol residue | Melting point (° C) | Solubility Ethyl acetate | Methyl ethyl ketone | Toluene |
|---|---|---|---|---|---|---|
| 1 | TPA 31 IPA 31 Adipic acid 38 | EG 59 NPG 41 | 60 | Soluble | Soluble | Soluble |
| 2 | TPA 30 IPA 20 Adipic acid 50 | EG 65 NPG 35 | 40 | Soluble | Soluble | Soluble |
| 3 | TPA 35 IPA 30 Adipic acid 35 | EG 60 NPG 40 | 66 | Soluble | Soluble | Soluble |
| 4 | TPA 31 IPA 31 Pimelic acid 38 | EG 60 NPG 40 | 60 | Soluble | Soluble | Soluble |
| 5 | TPA 31 IPA 31 Suberic acid 38 | EG 60 NPG 40 | 61 | Soluble | Soluble | Soluble |
| 6 | TPA 31 IPA 31 Acelaic acid 38 | EG 58 NPG 42 | 61 | Soluble | Soluble | Soluble |
| 7 | TPA 20 IPA 45 Azelaic acid 25 | EG 60 NPG 40 | 45 | Soluble | Soluble | Soluble |

EXAMPLE 2

The polymers (1 to 7) produced in Example 1 are each dissolved in a mixed solvent of toluene/methyl ethyl ketone (20/80 by weight) to give 40% solutions. These solutions are kept at 4° C, and even after more than 70 days, the solutions are clear and can stably be kept without gelation.

EXAMPLE 3

The polymers (1 to 7) produced in Example 1 are each dissolved in methyl ethyl ketone to give 40% solutions. These solutions are each applied to one side of a polyester film (a biaxially oriented film of polyethylene terephthalate, made by Toyobo Co., Ltd.; thickness: 19 $\mu$) and an aluminum foil (a defatted product [AIH-O], made by Nippon Seihaku K.K.; thickness: 50 $\mu$) and then dried at 85° C for 15 minutes. The resulting polyester film and the aluminum foil are piled with a polyester film and an aluminum foil which are not applied with the polymer, respectively. In this state, the thickness of the adhesive resin layer is 4 $\mu$. The resultants are subjected to contact bonding at 100° C, 4 kg/cm² for 10 seconds. The resulting samples are cut in a width of 1 cm, on which the peel strength is measured by a T-peeling test at 20° C and at a crosshead speed of 10 cm/minute by using a tensile tester (Tensilon, made by Toyo Sokuki K.K.). The results are shown in Table 2.

Table 2

| Product No. | T-Peel strength (g/cm) | | | |
|---|---|---|---|---|
| | 19 $\mu$ Polyester film/ 19 $\mu$ Polyester film | | 50 $\mu$ Aluminum foil/ 50 $\mu$ Aluminum foil | |
| | 20° C | 65° C | 20° C | 65° C |
| 1 | 70 | 320 | 305 | 340 |
| 2 | 55 | 3 | 60 | 5 |
| 3 | 50 | 360 | 230 | 400 |
| 4 | 95 | 305 | 320 | 330 |
| 5 | 100 | 340 | 340 | 365 |
| 6 | 115 | 345 | 365 | 380 |
| 7 | 60 | 10 | — | — |

EXAMPLE 4

In the same manner as described in Example 1, the polymers (8 to 11) as shown in the following Table 3 are produced.

Table 3

| Product No. | Polymer component (molar ratio) Acid residue | Glycol residue | Melting point (° C) | Intrinsic viscosity $[\eta]$ |
|---|---|---|---|---|
| 8 | TPA 35 IPA 30 Adipic acid 35 | EG 60 NPG 40 | 66 | 0.73 |
| 9 | TPA 35 IPA 30 Pimelic acid 35 | EG 60 NPG 40 | 64 | 0.72 |
| 10 | TPA 35 IPA 30 Suberic acid 35 | EG 60 NPG 40 | 67 | 0.76 |
| 11 | TPA 35 IPA 30 Azelic | EG 60 NPG 40 | 68 | 0.75 |

Table 3-continued

| Product No. | Polymer component (molar ratio) | | Melting point (° C) | Intrinsic viscosity [η] |
|---|---|---|---|---|
| | Acid residue | Glycol residue | | |
| | acid 35 | | | |

These polymers (8 to 11) are each dissolved in methyl ethyl ketone to give 13% methyl ethyl ketone solutions. These solutions are each applied in a thickness of 0.004 inch to one side of a polyethylene terephthalate film (thickness: 19 μ) and then dried well at 80° C, 35 mmHg for 20 minutes. On the coating layer is piled another polyethylene terephthalate film (thickness: 19 μ) or an aluminum foil (thickness: 50 μ). The resultants are subjected to a static loading of 22 g/cm² and allowed to stand at 22° C in an atmosphere of a relative humidity of 55% for 69 hours. The laminated products thus obtained are cut in a width of 2.0 cm, on which the peel strength is measured by a T-peeling test at 22° C and at a cross-head speed of 10 cm/minute by using a tensile tester (Tensilon, made by Toyo Sokuki K.K.) to evaluate the antiblocking of the products. The results are shown in Table 4.

Table 4

| Product No. | T-Peel strength (g/cm) | |
|---|---|---|
| | Polyester film/ Polyester film | Polyester film/ Aluminum foil |
| 8 | 8 | 10 |
| 9 | 9 | 25 |
| 10 | 7 | 40 |
| 11 | 10 | 65 |

The products having a smaller T-peel strength show better antiblocking.

REFERENCE EXAMPLE 1

In the same manner as described in Example 1, the polymers (1' to 3') as shown in Table 5 are produced.

The solubility into various solvents of these polymers (1' to 3') is measured. The results are shown in Table 5.

REFERENCE EXAMPLE 2

In the same manner as described in Example 1, the polymers (4' and 5') as shown in Table 6 are produced.

Table 6

| Product No. | Polymer component (molar ratio) | | Melting point (° C) | Intrinsic viscosity [η] |
|---|---|---|---|---|
| | Acid residue | Glycol residue | | |
| 4' | TPA 68 Adipic acid 32 | EG 58 NPG 42 | 65 | 0.64 |
| 5' | TPA 70 Azelaic acid 30 | EG 50 EG 50 | 66 | 0.63 |

The polymers (4' and 5') are each dissolved in a mixed solvent of toluene/methyl ethyl ketone (20/80 by weight) to give 40% solutions. These solutions are kept at 4° C. In the solution of the polymer (5'), white, insoluble solid materials having a low molecular weight are floated or precipitated and thereby the transparency of the solution is remarkably decreased. The solution of the polymer (4') is gelated and becomes jelly-like after being kept for 10 days.

REFERENCE EXAMPLE 3

In the same manner as described in Example 1, the polymers (6' to 9') as shown in Table 7 are produced.

In the same manner as described in Example 3, these polymers (6' to 9') are each dissolved in methyl ethyl ketone, and the solutions thus obtained are each applied on one side of a polyester film and an aluminum foil and then dried. The resulting polyester film and the aluminum foil are piled with a polyester film and an aluminum foil which are not applied with a adhesive, respectively, and then the resultants are subjected to contact bonding. The samples thus obtained are cut in a width of 1 cm, on which the peel strength is measured by a T-peeling test at 20° C and at a cross-head speed of 10 cm/minute by using a tensile tester (Tensilon, made by Toyo Sokuki K.K.). The results are shown in Table 7.

Table 5

| Product No. | Polymer component (molar ratio) | | Melting point (° C) | Solubility | | |
|---|---|---|---|---|---|---|
| | Acid residue | Glycol residue | | Ethyl acetate | Methyl ethyl ketone | Toluene |
| 1' | TPA 65 Adipic acid 35 | EG 55 DEG 45 | 61 | Insoluble | Insoluble | Insoluble |
| 2' | TPA 46 IPA 19 Adipic acid 35 | ED 58 DEG 42 | 50 | Insoluble | Slightly soluble | Insoluble |
| 3' | TPA 26 IPA 39 Adipic acid 35 | EG 100 | 59 | Insoluble | Insoluble | Insoluble |

Table 7

| Product No. | Polymer component (molar ratio) | | T-Peel strength (g/cm) | |
|---|---|---|---|---|
| | Acid residue | Glycol residue | 19 μ Polyester film/ 19 μ Polyester film | 50 μ Aluminum foil/ 50 μ Aluminum foil |
| 6' | TPA 50 IPA 50 | EG 60 NPG 40 | 5 | 4 |
| 7' | TPA 59 IPA 32 Adipic acid 9 | EG 55 NPG 45 | 2 | 3 |
| 8' | TPA 20 IPA 10 Adipic acid 9 | EG 55 NPG 45 | 3 | 5 |

Table 7-continued

| Product No. | Polymer component (molar ratio) Acid residue | Glycol residue | T-Peel strength (g/cm) 19 μ Polyester film/ 19 μ Polyester film | 50 μ Aluminum foil/ 50 μ Aluminum foil |
|---|---|---|---|---|
| 8' | TPA 20 IPA 10 Adipic acid 70 | EG 55 NPG 45 | 3 | 5 |
| 9' | TPA 32 IPA 18 Adipic acid 50 | EG 20 NPG 80 | 2 | 4 |

REFERENCE EXAMPLE 4

In the same manner as described in Example 1, the polymer (10') as shown in Table 8 is produced. The polymer has a melting point of 65° C and an intrinsic viscosity [η] of 0.69.

In the same manner as described in Example 4, a solution of the polymer (10') in methyl ethyl ketone is applied to one side of a polyethylene terephthalate film (thickness: 19 μ) and then dried. On the coated layer is piled another polyethylene terephthalate film (thickness: 19 μ) or an aluminum foil (thickness: 50 μ) and then allowed to stand. The laminated products thus obtained are cut in a width of 2.0 cm, on which the peel strength is measured by a T-peeling test at 22° C and at a cross-head speed of 10 cm/minute by using a tensile tester (Tensilon, made by Toyo Sokuki K.K.) to evaluate the antiblocking of the products. The results are shown in Table 8.

Table 8

| Product No. | Polymer component (molar ratio) Acid residue | Glycol residue | T-Peel strength (g/cm) Polyester film/ Polyester film | Polyester film/ Aluminum foil |
|---|---|---|---|---|
| 10' | TPA 35 IPA 30 Sebacic acid 35 | EG 60 NPG 40 | 18 | 120 |

As is made clear from the test results of Table 4 and Table 8, the polymers (8 to 11), which are produced by using aliphatic dicarboxylic acids of the present invention, have a smaller T-peel strength, i.e. more excellent antiblocking in comparison with the polymer (10'), which is produced by using sebacic acid.

EXAMPLE 5

In the same manner as described in Example 1, the polymers (12 to 15) as shown in Table 9 are produced.

With these polymers (12 to 15), the solubility into various solvents (i.e. ethyl acetate, methyl ethyl ketone or toluene) is tested. As the results, all polymers show good solubility.

Besides, the polymers (12 to 15) are each dissolved in a mixed solvent of toluene/methyl ethyl ketone (20/80 by weight) to give 40% solutions. These solutions are kept at 4° C, and even after more than 70 days, the solutions are clear and can stably be kept without gelation.

Moreover, in the same manner as described in Example 3, the polymers (12 to 15) are each dissolved in methyl ethyl ketone and the resulting solutions are applied to one side of a polyester film and then dried. The resulting polyester film is piled with a polyester film and an aluminum foil which are not applied with the polymer, and then the resultants are subjected to contact bonding. The samples thus obtained are cut in a width of 1 cm, on which the peel strength is measured by a T-peeling test at 65° C and at a cross-head speed of 10 cm/minute by using a tensile tester (Tensilon, made by Toyo Sokuki K.K.). The results are shown in Table 9.

Table 9

| Product No. | Polymer component (molar ratio) Acid residue | Glycol residue | T-Peel strength (g/cm) Polyester film/ Polyester film |
|---|---|---|---|
| 12 | TPA 55 IPA 10 Adipic acid 35 | EG 50 NPG 50 | 450 |
| 13 | TPA 45 IPA 20 Adipic acid 35 | EG 50 NPG 50 | 400 |
| 13 | TPA 33 IPA 32 Adipic acid 35 | EG 50 NPG 50 | 350 |
| 13 | TPA 33 IPA 32 Adipic acid 35 | EG 50 NPG 50 | 350 |
| 15 | TPA 20 IPA 45 Adipic acid 35 | EG 50 NPG 50 | 50 |

REFERENCE EXAMPLE 5

Example 5 is repeated except that the amounts of the terephthalic acid component and the isophthalic acid component are varied to give the polymers (11' to 13') as shown in Table 10.

Table 10

| Product No. | Polymer component (molar ratio) Acid residue | Glycol residue |
|---|---|---|
| 11' | TPA 65 IPA 0 Adipic acid 35 | EG 50 NPG 50 |
| 12' | TPA 10 IPA 55 Adipic acid 35 | EG 50 NPG 50 |
| 13' | TPA 0 IPA 65 Adipic acid 35 | EG 50 NPG 50 |

The polymers (11' to 13') thus obtained are each dissolved in a mixed solvent of toluene/methyl ethyl ketone (20/80 by weight) to give 40% solutions. These solutions are kept at 4° C. In the solution of the polymer (11'), white, insoluble solid materials having a low molecular weight are floated or precipitated and thereby the transparency of the solution is remarkably decreased.

Besides, in the same manner as described in Example 3, these polymers (11' to 13') are each dissolved in methyl ethyl ketone and the solutions thus obtained are each applied to one side of a polyester film and an aluminum foil and then dried. The resulting polyester film and the aluminum foil are piled with a polyester film and an aluminum foil which are not applied with the polymer, respectively, and then the resultants are subjected to contact bonding. The samples thus obtained are cut in a width of 1 cm, on which the peel strength is measured by a T-peeling test at 65° C and at a cross-head speed of 10 cm/minute by using a tensile tester (Tensilon, made by Toyo Sokuki K.K.). As the results, the peel strength of samples produced by using the polymers (12') and (13') is less than 10 g/cm.

EXAMPLE 6

|  | Part by weight |
| --- | --- |
| (1) A solution of the polymer (1) (30 g) obtained in Example 1 in styrene monomer (70 g) | 20 |
| (2) A solution of an unsaturated polyester (maleic acid/orthophthalic acid: 70/30 by mol, and propylene glycol) (70 g), which is produced by a conventional method, in styrene monomer (30 g) | 40 |
| (3) Particulate calcium carbonate | 90 |
| (4) Benzoyl peroxide | 0.6 |
| (5) Stearic acid | 1.5 |

The above components (1) to (5) are mixed together and the mixture is filled in a mold and then subjected to a pressure molding at 130° C and at 100 kg/cm² to give a molded product having a smooth surface. The shrinkage at the molding is 0.18%.

As a reference example, the components (2) to (5) [i.e. without using the component (1) and instead thereof the component (2) is used in an amount of 60 parts by weight] are mixed together, and the mixture is subjected to the pressure molding in the same manner as described above. The product thus obtained has cracks on the surface. The shrinkage at the molding is 2.31%.

The shrinkage at the molding is calculated by the following equation:

$$\text{Shrinkage at the molding (\%)} = \frac{\left(\begin{array}{c}\text{Size of}\\\text{the mold}\end{array}\right) - \left(\begin{array}{c}\text{Size of the}\\\text{molded product}\end{array}\right)}{(\text{Size of the mold})} \times 100$$

What is claimed is:
1. A copolyester derived from:
   a. terephthalic acid or an ester-forming derivative thereof,
   b. isophthalic acid or an ester-forming derivative thereof,
   c. an aliphatic dicarboxylic acid of the formula:

$$HOOC - (CH_2)_n - COOH$$

wherein $n$ is an integer of 4 to 7, inclusive, or an ester-forming derivative thereof,
   d. ethylene glycol, and
   e. neopentyl glycol,
wherein the molar ratios of the components in the copolyester are as follows:

$$50/50 \leq [(a) + (b)]/(c) \leq 75/25$$

$$30/70 \leq (a)/(b) \leq 70/30$$

$$40/60 \leq (d)/(e) \leq 80/20.$$

2. The copolyester according to claim 1, wherein the molar ratios of the components are $$55/45 \leq [(a) + (b)]/(c) \leq 65/35$$

$$30/70 \leq (a)/(b) \leq 70/30$$

$$40/60 \leq (d)/(e) \leq 80/20.$$

3. The copolyester according to claim 1, wherein the aliphatic dicarboxylic acid (c) is at least one of the members selected from the group consisting of adipic acid, pimelic acid, suberic acid and azelaic acid.

4. The copolyester according to claim 3, wherein the aliphatic dicarboxylic acid (c) is adipic acid.

5. A copolyester derived from
   a. terephthalic acid,
   b. isophthalic acid,
   c. adipic acid,
   d. ethylene glycol, and
   e. neopentyl glycol,
wherein the molar ratio of the components (a)/(b)/(c) is 25–35/25–35/35–45 and the molar ratio of the components (d)/(e) is 50–60/40–50.

6. A copolyester derived from:
   a. dimethyl terephthalate,
   b. dimethyl isophthalate,
   c. adipic acid,
   d. ethylene glycol, and
   e. neopentyl glycol,
wherein the molar ratio of the components (a)/(b)/(c) is 25–35/25–35/35–45 and the molar ratio of the components (d)/(e) is 50–60/40–50.

* * * * *

UNITED STATES PATENT AND TRADEMARK OFFICE
CERTIFICATE OF CORRECTION

PATENT NO. : 4,065,439
DATED : December 27, 1977
INVENTOR(S) : Keiichi Uno et al It is certified that error appears in the above–identified patent and that said Letters Patent are hereby corrected as shown below:

IN THE HEADING OF THE PATENT:

Change the city of the Assignee from "Otsu" to --Osaka--.

Signed and Sealed this

Nineteenth Day of September 1978

[SEAL]

Attest:

RUTH C. MASON
Attesting Officer

DONALD W. BANNER
Commissioner of Patents and Trademarks